UNITED STATES PATENT OFFICE.

ABRAHAM GESNER, OF NEW YORK, N. Y., ASSIGNOR, BY MESNE ASSIGNMENTS, TO NORTH AMERICAN KEROSENE AND GAS LIGHT COMPANY.

IMPROVEMENT IN BURNING-FLUID COMPOUNDS.

Specification forming part of Letters Patent No. 12,987, dated May 29, 1855.

*To all whom it may concern:*

Be it known that I, ABRAHAM GESNER, late of the city and county of New York, now of Williamsburg, in the county of Kings and State of New York, have invented and discovered a new and useful Burning-Fluid for Artificial Illumination; and I do hereby declare that the following is a full, clear, and exact description of the manner of making and using the same.

This burning-fluid is a compound of alcohol, (which I prefer of specific gravity .844, at a temperature of 60° Fahrenheit; but I do not confine myself to this proof or strength,) and the new liquid hydrocarbon, which I call "kerosene," and which is fully described in the specification of Letters Patent granted to my assignees on the —— day of ——— 1854. I take what in the said patent I denominate the "second-proof" kerosene, or "B" kerosene, (the "C" kerosene described in said specification being unsuitable for this purpose,) and mix as much of it with the alcohol as the latter will dissolve. Twenty-five parts of the "B" kerosene requires seventy-five parts of alcohol of the above-mentioned strength to dissolve it. The exact proportions of the alcohol and the kerosene above mentioned will not under all circumstances be the best, as variations in either the quality of the kerosene or the strength or quality of the alcohol will render a corresponding variation in the relative quantity of the two in the mixture necessary, the rule in all cases for producing the best burning-fluid being to saturate the alcohol with the kerosene without excess, when the mixture will burn in an Argand lamp, such as is used for burning benzole and other hydrocarbons, and will give a brilliant light. After the alcohol and kerosene have been mixed the mixture may be distilled in a common still, in order to unite the ingredients more intimately; but if they are simply mixed while warm the resulting burning-fluid will be of satisfactory quality. The latter is the mode in which I have practiced the preparation of this burning-fluid.

The burning-fluid thus prepared will readily burn in a spirit, gas, or wick lamp, or in a phosgene-lamp, giving a brilliant, white, and agreeable light.

I claim—

As a new manufacture or composition of matter, the burning-fluid composed of alcohol and "B" kerosene, as herein specified.

In testimony whereof I have hereunto subscribed my name.

ABRAHAM GESNER.

In presence of—
 H. J. DITMASS,
 D. B. CUNNINGHAM.